(12) United States Patent
Patel et al.

(10) Patent No.: US 9,514,333 B1
(45) Date of Patent: Dec. 6, 2016

(54) SECURE REMOTE APPLICATION SHARES

(71) Applicant: Amazon Technologies, Inc., Seattle, WA (US)

(72) Inventors: Anand Bhupendra Patel, Seattle, WA (US); Samuel Scott Gigliotti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/572,629

(22) Filed: Dec. 16, 2014

(51) Int. Cl.
*G06F 21/00* (2013.01)
*G06F 21/62* (2013.01)
*G06F 3/0481* (2013.01)
*H04L 29/06* (2006.01)

(52) U.S. Cl.
CPC ......... *G06F 21/6245* (2013.01); *G06F 3/0481* (2013.01); *H04L 63/08* (2013.01)

(58) Field of Classification Search
CPC .... G06F 21/10; G06F 21/6218; G06F 3/0481; G06F 21/6245; H04L 63/08
USPC ............................................ 726/28
See application file for complete search history.

(56) References Cited

U.S. PATENT DOCUMENTS

| | | | |
|---|---|---|---|
| 2006/0294247 A1* | 12/2006 | Hinckley | G06F 3/038 709/228 |
| 2011/0154219 A1* | 6/2011 | Khalatian | G06F 3/1462 715/751 |
| 2012/0036452 A1* | 2/2012 | Coleman | G06F 21/55 715/751 |

\* cited by examiner

*Primary Examiner* — Alexander Lagor
(74) *Attorney, Agent, or Firm* — Davis Wright Tremaine LLP

(57) ABSTRACT

A customer support application provides screen sharing of the user's computing device with a remote customer support agent, thereby enabling the customer support agent to view the content displayed on the user's device. At least a portion of the content displayed on the user's device may contain sensitive information. Coordinates corresponding to the content displayed on the user's device may be obtained and the portion of the display corresponding to the coordinates may be obscured from the remote customer support agent.

18 Claims, 9 Drawing Sheets

SECURE REMOTE APPLICATION SHARES

BACKGROUND

The use of computing devices by users having varying levels of technical expertise generates new opportunities for providing improved user experiences through convenient and effective customer support. In-person customer support at retail locations and computer service centers can provide a high level of service, but travelling to a physical location may be inconvenient for the customer and the cost of maintaining the staff and facilities at such a location can be undesirably high. Customer support by e-mail might be more convenient as it permits the user to initiate the service request from any location, but results in undesirable delays due to the asynchronous nature of e-mail communication. Telephone support may provide improved response time and a more personal interaction with the support agent, but due to varying user levels of technical expertise and the limitations of voice communications, it may be challenging for the user to clearly communicate the problem being experienced and challenging for the support agent to clearly communicate the steps needed to resolve the problem.

BRIEF DESCRIPTION OF THE DRAWINGS

Various embodiments in accordance with the present disclosure will be described with reference to the drawings, in which.

DETAILED DESCRIPTION

Figure 1:
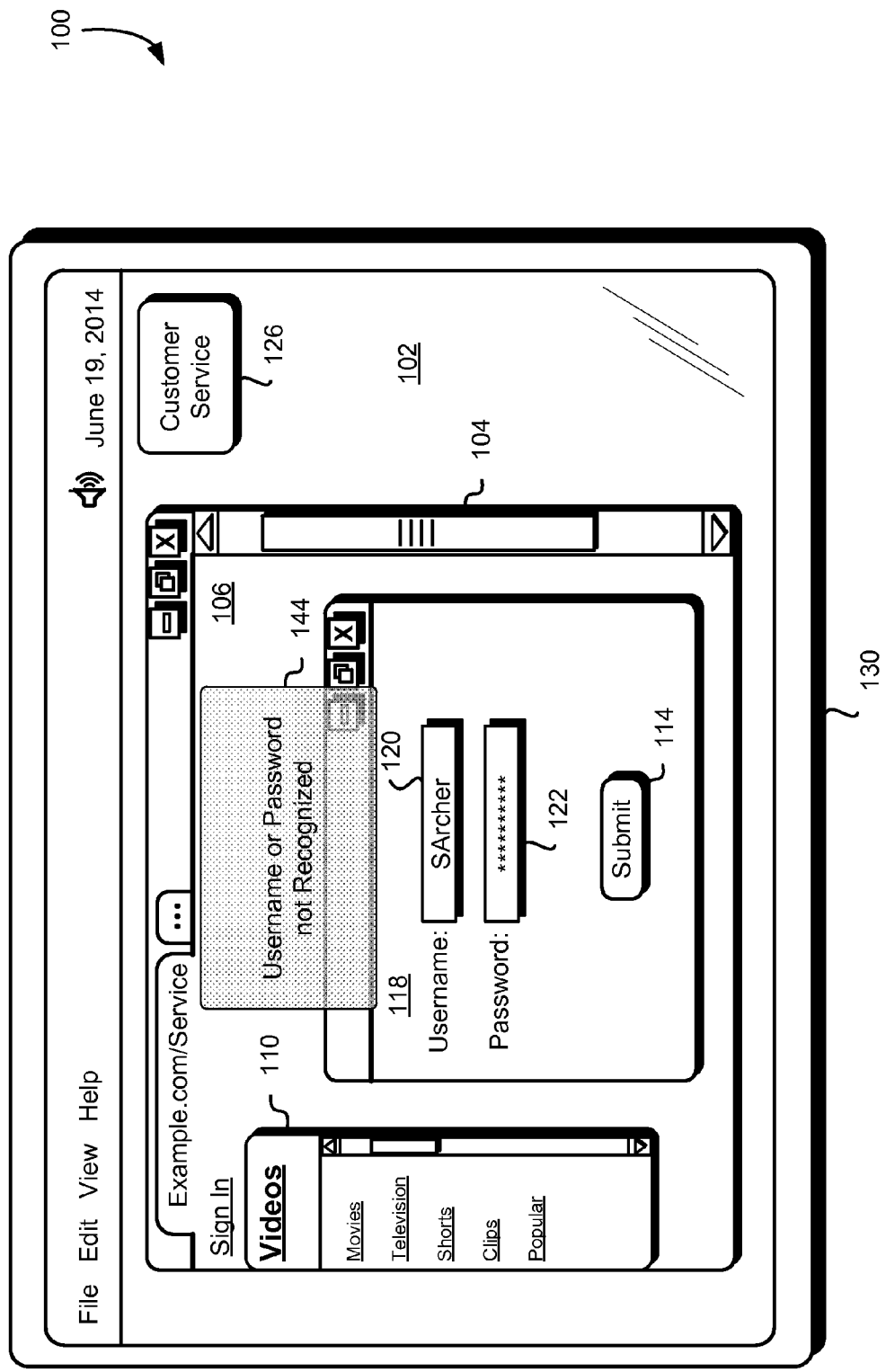
FIG. 1 is an environment illustrating a user login screen for providing credential information in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein can be incorporated into a support application which provides screen sharing of a user's computing device with a remote customer support agent, thereby enabling the customer support agent to see what is displayed by a user interface of the user's computing device. Additionally, the customer support agent may interact with a support application configured to display the screen of the user's computing device. The support application may also include a masking feature to blur or otherwise obscure sensitive information displayed on the screen of the user's computing device, such as a password or credit card number. In addition, the customer support agent can utilize the support application executed by the agent's computing device to generate graphics or cause the execution of applications by the user's computing device to help guide the user. For example, the support application may transmit a command to the user's computing device to execute a secure clipboard application. The secure clipboard application may enable the user to enter a password or other credential information in such a way that the entered information is obscured from the customer support agent but visible to the user.

In accordance with some embodiments, the support application can also provide screen sharing in conjunction with a live voice chat between the user and the remote customer support agent and a streaming video image of the customer support agent on the user's computing device. In addition, the support application may also register to receive events from various applications implemented by the user's computing device including the secure clipboard application. For example, the support application may obtain information corresponding to the user's input through an input device, such as a keyboard or a touchscreen, to the secure clipboard application. At least a portion of the obtained information may be provided to the customer support agent to enable the customer support agent to provide improved customer support to the user. For example, the support application may determine a number and type of characters entered by a user into the secure clipboard application. The customer support agent may then use this information to determine if the user has mis-entered their password.

The support application may also be configured to enable the user to select a portion of the screen of the user's computing device to be masked or otherwise obscured from view by the customer support agent. For example, the customer support agent may select a portion of the screen displayed by the support application to be obscured. A set of coordinates corresponding to the selected portion of the screen may be transmitted to the user's computing device. The user's computing device may then modify a frame buffer containing the screen displayed by the user's computing device to obscure the portion of the screen indicated by the set of coordinates prior to transmitting the frame buffer to the customer support agent. By using these techniques, the user's sensitive information remains on the user's computing device and is not exposed. For example, the secure clipboard application, described above, may enable the user to enter a password and copy the password to a clipboard application or clipboard memory of the user's computing device and paste the password into a password field displayed by the user interface of the user's computing device. In various other embodiments, sensitive information may be encrypted and transmitted to the support application or other computer system. For example, the user's credit card information may be provided to the support application but may be obscured from view by the customer support agent.

FIG. 1 shows an illustrative example of an environment 100 in which a user interface comprising a login screen is displayed by a computing device described herein in accordance with various embodiments. In particular, FIG. 1 shows a display device 130, which displays a user interface 102. The display device may be, for example, a computer monitor of a notebook or personal computer, a display of a mobile device, a display of a tablet computing device, or otherwise a display of a computing device. In an embodiment, the user interface 102 is provided by an operating system of a computing device causing the user interface 102 to be displayed. In the particular example illustrated in FIG. 1, a display of an application 104 is displayed on the user interface 102. The application 104 may be, for example, the web browser application displaying a webpage 106. The web browser application 104 may be an application executed by a computing device enabling a user to interact with login screen comprising a user interface 118. The webpage 106 may also include various other graphical user interface elements 110 that enable navigation throughout a website of which the webpage 106 is a part.

In this particular example, the application 104 provides the interface 118 which includes a username field 120 and a password field 122. The username field 120 and the password field 122, in this example, are graphical user interface elements that enable a user to enter (e.g., via a virtual or physical keyboard) alphanumeric input corresponding to respectively a username and password. As with all embodiments described herein, variations that utilize different credentials or additional credentials are also considered as being within the scope of the present disclosure. In some embodiments, the interface 118 is displayed on a mobile device or other device separate from the computing device executing the browser application 104, such as a second screen or second factor authentication device.

Figure 2:
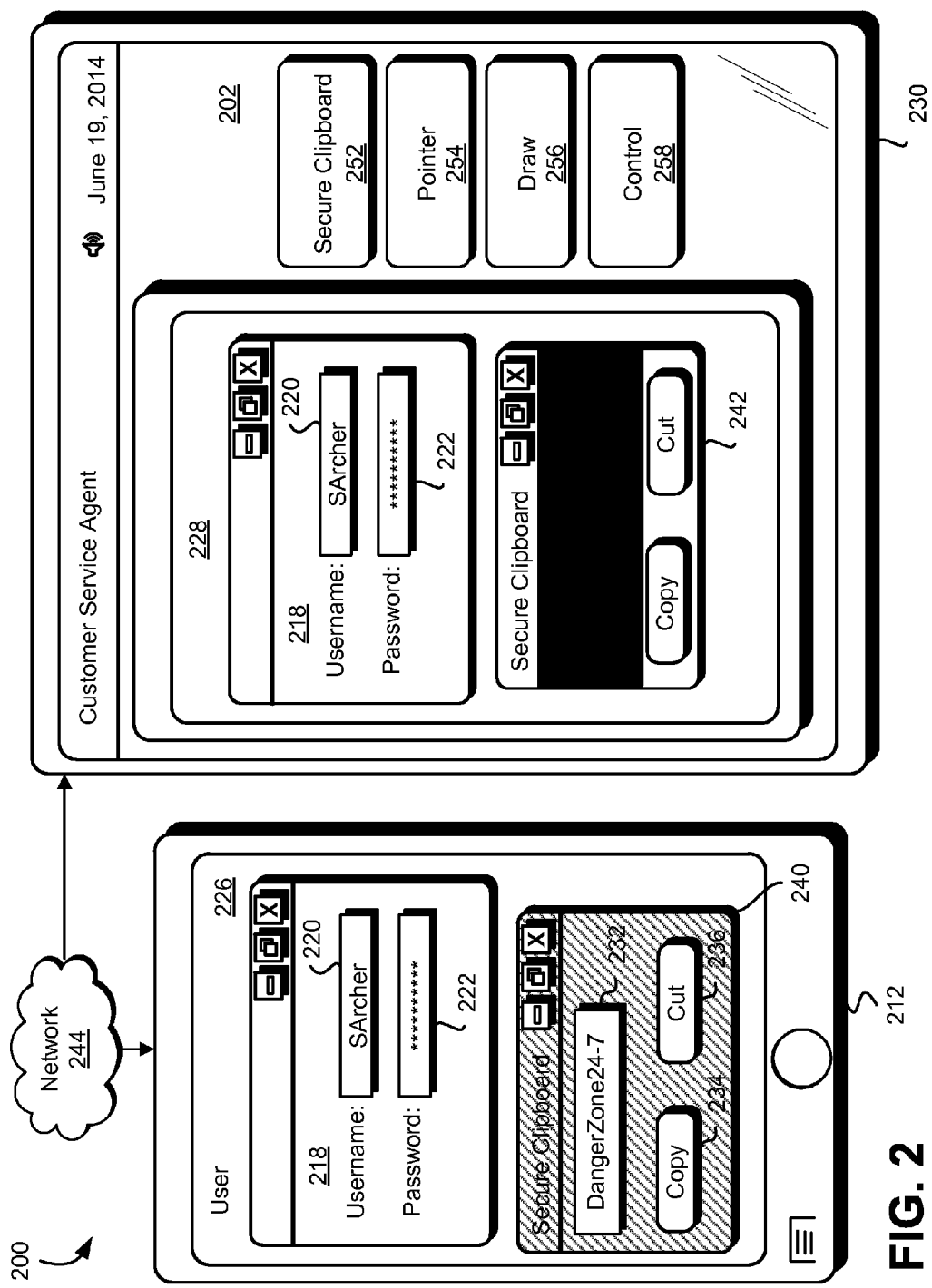
FIG. 2 is an environment illustrating a secure clipboard for use with a customer support application in accordance with an embodiment.

As illustrated by FIG. 1, users may, on occasion, incorrectly enter username and password information into the username field 120 and password field 122. In this example, the password field 122 is configured to obscure the password once entered into the password field 122, preventing the user from confirming that the password was entered correctly before providing the password for authentication. The user may provide their username and password by selecting, through an input device connected to the computing device, the submit button 114. The submit button 114 may be a graphical user interface element configured to transmit information inputted into the username field 120 and password field 122 to a computing resource service provider for authentication. If the username and password are not recognized by the computing resource service provider or component thereof, the computing resource service provider may cause the browser application 104 to display an error message 144 as illustrated in FIG. 1. For example, a webserver implemented by the computing resource service provider may transmit a Hypertext Transfer Protocol (HTTP) response to the computing device, the HTTP response may cause the browser application to display a message indicating the user has incorrectly entered their password. The user may contact customer support by selecting the "customer support" button from the user interface 102. The customer support button 126 may be a graphical user interface element where the underlying code corresponding to the customer support button may cause the computing device 130 to execute a support application described in greater detail below, FIG. 2 illustrates an example environment 200 where a computing device 212 may provide a secure clipboard application to a user to enable the user to enter credential information that may be used in connection with a login screen 218 and support application. A user may utilize the computing device 212 to access various restricted computing resources. The various restricted computing resources may require user authentication information, including a username and password or other credentials. The computing device 212 may utilize a variety of security features in order to protect the computing device 212 and the user's sensitive information, such as the user's username and password. As illustrated in FIG. 2, a login screen 218 may prevent unauthorized users from accessing restricted computing resources. The login screen 218 may be a user interface element utilized by various operating systems or other applications implemented by a computer system, such as the computing device 212. The login screen 218 may regulate immediate access to restricted computing resources by requiring that the user perform a certain action in order to receive access such as entering a password, using a certain button combination, or by performing a certain gesture using a touchscreen or other interface of the computing device 212. In various embodiments, the login screen 218 of the computing device 212 may provide at least some functionality beyond enabling access to restricted computing resources. For example, the login screen 218 may enable the user to navigate various webpages of a web site as described above in connection with FIG. 1. Generally, techniques of the present disclosure are applicable to changes of state where additional functionality is accessible as a result of a user demonstrating, through user input, information sufficient for making such additional functionality accessible.

The computing device 212 may be operating in accordance with a corresponding operating system such as a version of an Android® operating system, a Windows® phone operating system or an Apple® iOS operating system, although the techniques of the present disclosure are not limited to those operating systems discussed explicitly herein. The computing device 212 may be the computing device described below in connection with FIG. 8, or may be a computing device incorporating components of the device described above in connection with FIG. 8. For example, the computing device 212 may be a smartphone, tablet, notebook computer, desktop computer, or other computer system, although the techniques described in connection with FIG. 2 are not limited to such devices. Additionally, the operating system of the user's computing device may be configured to provide a support application with information corresponding to user interface element or fields configured to receive sensitive information. For example, the operating system may determine an application of the user's computing device is utilizing a password field and indicate to the support application that the password field is being utilized. The support application may cause the password field to be obscured prior to streaming the user interface to the customer support agent or may indicate to the customer support agent that the user interface contained a password field.

In this example illustrated in FIG. 2, as noted, the interface 218 is configured to enable the input of credentials sufficient for access to functionality of restricted computing resources. In this example, the interface 218 includes a username field 220 and a password field 222 which, in this example, are graphical user interface elements that enable a user to enter (e.g., via a virtual or physical keyboard) alphanumeric input corresponding to respectively a username and password. As with all embodiments described herein, variations that utilize different credentials or additional credentials are also considered as being within the scope of the present disclosure. The interface 218 may be displayed on the computing device 212. The user utilizing the computing device 212 may connect to a second computing device, such as a customer support agent computing device 230, via a network 244. The network 244 includes, for example, the Internet, intranets, extranets, wide area networks (WANs), local area networks (LANs), wired networks, wireless networks, or other suitable networks, or any combination of two or more such networks.

When the user launches a customer support application on the computing device 212 and initiates a screen sharing function, user interface content 226 currently being displayed on the computing device 212 is transmitted to the support agent computing device 230. The user interface content 226 includes an operating system user interface or an interface of one or more software applications that may run on the computing device 212. Furthermore, the user interface content 226 may be transmitted as a frame buffer or frame store, which may be a portion of memory comprising a bitmap that is provided to a video display from the memory buffer containing a complete frame of data. The user interface content 226 may be received as a video stream by the support agent computing device 230.

The support agent computing device 230 may execute a customer support application, which then displays the screen sharing image 228 of the user interface content 226 displayed on the user's computing device 212 on the agent's display 202. This screen sharing image 228 enables the customer support representative to better assist the user by presenting the representative with a live feed or video stream of at least a portion of the user interface of the user's computing device 212. In various embodiments, computing devices are configured to dynamically change the user interface aspect ratio, depending on the orientation in which the device is held by the user. Therefore, the user interface may switch from portrait to landscape mode in the middle of a support session. The customer support application is configured to adjust the screen sharing image 228 to reflect the current orientation of the user computing device 212. Although the user interface for many desktop computers are configured to adjust from landscape to portrait mode, this adjustment is typically done much more frequently by tablet computer users due to the ease with which the orientation may be changed. In addition, many tablet computing applications only operate in a single orientation mode. Therefore, if the user is browsing an application menu in landscape mode, and launches a portrait-only application, the user interface (and screen sharing image 228) will automatically change to portrait mode.

The customer support application may also provide the agent with one or more support tools, which the customer support agent may utilize to respond to the user's inquiries or requests for assistance. In the illustrated embodiment, the customer support application includes a control tool 258, a drawing tool 256, a pointer tool 254, and a secure clipboard tool 252. The agent may utilize peripheral input devices of the agent computing device 230, such as, for example, a mouse and a keyboard, to select one of the tools and then interact with the screen sharing image 228 using that tool to produce the desired result on the user's computing device 212. The drawing tool 256 provides a graphics editor function that enables the agent to utilize one or more graphics tools to create graphical elements to be displayed on top of the user's content 226. The graphics tools may enable the agent to draw freeform and/or non-freeform shapes, such as a line, curve, or box, or to add text or other images. These graphical elements can be transmitted as, e.g., raster or vector graphics images to the user's computing device 212, where they are displayed on top of the user interface of the user's computing device 212. The agent may use these graphical elements to provide visual guidance to the user, such as to highlight a button to select or a touch input to perform. The graphical elements can be transmitted as a live, streaming feed to the user's computing device 212 as they are generated by the agent so the user can see an animated display of the graphical elements. In other embodiments, the graphical elements are transmitted as static images to the computing device 212. These static images can be drawn by the customer support agent using the agent's computing device 230 and periodically transmitted to the computing device 212 automatically or manually by the agent.

The pointer tool 254 provides the agent with a graphical element comprising a pointer that the agent can move about the screen without leaving a trail or other persistent image, as would occur if using the drawing tool 256. The agent may move the pointer over the surface of the user's content to draw the user's attention to various elements displayed. For example, the agent may use the pointer tool to draw the user's attention to a secure clipboard user interface element 240. The pointer tool 254 provides a transient graphical element that the user can observe as it is manipulated by the agent, but does not leave a persistent image on the user interface 226. The pointer 254 can function in a similar fashion as the mouse pointer used in traditional graphical user interfaces for selecting items. However, when the user's computing device 212 includes a touchscreen, the operating system may be adapted to primarily or solely receive touch inputs, and not utilize a pointer cursor. Therefore, the pointer cursor may not be an integral function of the user's computing device 212 or operating system of the user's computing device 212. In addition, when the user's computing device 212 does provide for pointer functionality, it may be desirable for the customer support agent to have a separate pointer controlled by the customer support agent, while enabling the user to simultaneously operate the user's pointer function, such as, for example, to carry out the instructions provided by the customer support agent. The ability to show the user what to do, and then permit the user to perform those tasks on his or her own, can provide a much more effective training function than if the customer support agent were to perform those tasks directly.

In other situations, it may be desirable for the customer support agent to perform tasks directly on the user's computing device 212. The control input tool 258 may provide the agent with the ability to produce inputs and/or commands that are received by the user's computing device 212 and recognized as user inputs as if the user had provided those inputs using, for example, a touch-screen display. The control input tool 258 may provide the agent with a pointer or other cursor that the agent may move across the surface of the content 228 using the mouse, with touch inputs being generated using, for example, the buttons on the agent's mouse or keyboard. For example, the customer support agent may, using the control tool 258, copy the user's password from the secure clipboard user interface element and paste the password into the password field 222. The control tool 258 may be useful when the agent performs functions or tasks directly onto the user's computing device 212, rather than merely explaining to the user what the user should do, as may be the case when utilizing the drawing tool 256 or pointer tool 254. This may be particularly desirable when the user does not wish to be trained on how to perform a task, but would rather have the task completed without effort on the user's part.

The secure clipboard tool 252 may, similarly to the control tool 258, provide input and/or commands to the user's computing device 212. When the agent selects the secure clipboard tool 252, the customer support agent computing device 230 may transmit a command over the network 244 to the support application executed by the user's computing device 212. The command may cause the user's computing device 212 to display the secure clipboard user interface element 240. In various embodiments, the secure clipboard user interface element 240 is a user interface of a standalone application. As illustrated by FIG. 2, the secure clipboard user interface element 240 may include a clear-text password field 232, a copy button 234, and a cut button 236. There may be an indication provided to the user that the secure clipboard user interface element 240 is hidden from the support agent, illustrated in FIG. 2 as striping across the background of the secure clipboard user interface element 240. The clear-text password field 232 may enable the user to see the characters entered into the field, in comparison to the password field 222, where the characters entered by the user are obscured or otherwise indecipherable by the user. The copy button 234 may be a graphical user interface element configured to generate a copy of the characters inputted into the clear-text password field 232 in a clipboard memory of the computing device 212 or operating system implemented by the computing device 212. Similarly, the cut button 236 may be a graphical user interface element configured to generate a copy of the characters inputted into the clear-text password field 232 in a clipboard memory of the computing device 212 or operating system implemented by the computing device 212 and remove the characters from the clear-text password field 232.

Furthermore, the support application may be configured to obscure 242 the secure clipboard user interface element 240 when displayed in the screen sharing image 228. For example, a video encoding application implemented by the user's computing device 212 may blur or black out the secure clipboard user interface element 240 before transmitting the video stream to the customer support agent computing device 230. In another example, the user's computing device 212 or application thereof, such as the support application, may provide information corresponding to the clipboard user interface element 240 to the customer support agent computing device 230. The information may include coordinates of the clipboard user interface element 240 and/or scroll offset information of the clipboard user interface element 240. The customer support agent computing device 230 may then obscure 242 the portion of the screen sharing image 228 corresponding to the secure clipboard user interface element 240.

Figure 3:
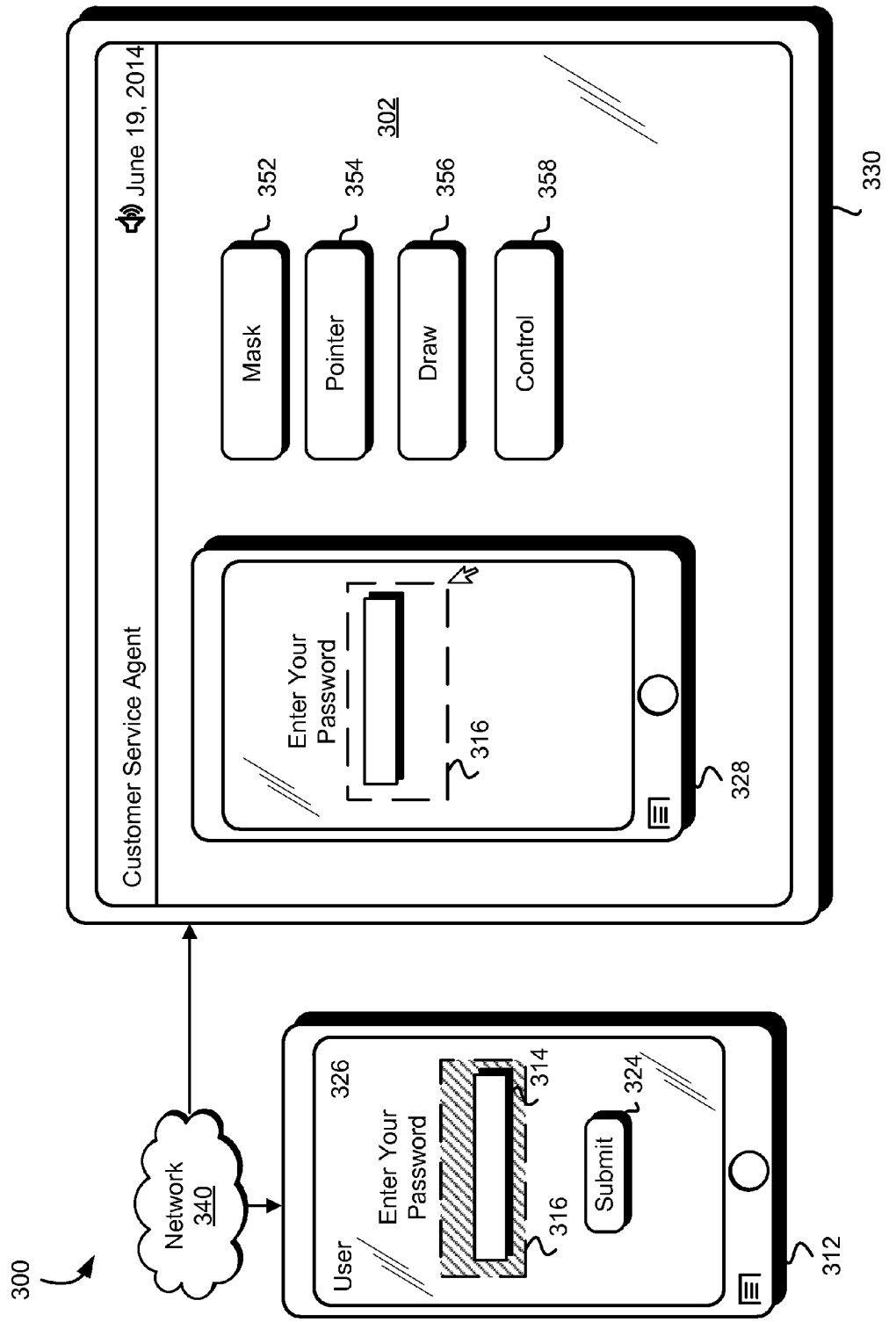
FIG. 3 is an environment illustrating a masking application for use with a customer support application in accordance with an embodiment.

FIG. 3 illustrates an example environment 300 where a customer support agent computing device 230 may provide a masking tool to obscure at least a portion of a screen sharing image 328 representing a user interface of a computing device 312. A user may utilize the computing device 312 to access various restricted computing resources. The computing device 312 may include a user interface content 326 which is currently being displayed on the computing device 312. A support application executed by the computing device 312 may cause the user interface content 326 to be transmitted to the support agent computing device 330. The user interface content 326, in the example illustrated in FIG. 3, includes a password field 314 and a submit button 324. The user interface content 326 may be displayed by an application implemented by the computing device 312. For example, the user interface content 326 may be a login screen of a social networking application. The password field 314 may be a password field as described above in connection with FIG. 2. Furthermore, the submit button 324 may be a graphical user interface element configured to provide information entered into the password field 314 to another computer system for authentication.

A customer support application 302 may also provide the agent with one or more support tools, which the customer support agent may utilize to respond to the user's inquiries or requests for assistance. In the illustrated embodiment, the customer support application 302 includes a control tool 358, a drawing tool 356, a pointer tool 354, and a masking tool 352. The support application 302 may be implemented by the customer support agent computing device 330 and may communicate with the computing device 312 over a network 340 as described above. Furthermore, the agent may utilize peripheral input devices of the customer support agent computing device 330, such as, for example, a mouse and a keyboard, to select one of the tools and then interact with the screen sharing image 328 using that tool to produce the desired result on the user's computing device 312. The control tool 358, the drawing tool 356, and the pointer tool 354 may be configured as described above in connection with FIG. 2. The masking tool 352 may enable the agent to select a portion 316 of the screen sharing image 328 to be obscured. In various embodiments, the user can mask the portion of the screen 316 using the masking tool 352. For example, the user may select a graphical user interface element corresponding to the masking tool 352 from a user interface of the user's computing device, selection of the graphical user interface element may cause the user's computing device 312 to execute the masking tool 352 enabling the user to select the portion of the screen 316. In addition, the support application executed by the user's computing device may detect various input fields of the user interface that may be considered sensitive, such as, address, zip code, name, phone number, contact information, e-mail address, credit card information, social security number, or any other information that may be considered sensitive to the user. The user may be able to preselect certain fields or information that is sensitive to the user and the support application may automatically obscure the preselected information prior to providing the video stream to the support agent computing device 330.

Once the agent has selected the portion 316 of the screen sharing image 328 to be obscured, a set of screen coordinates corresponding to the portion of the screen sharing image 328 may be transmitted to the computing device 312. As described above, a video encoding application of the computing device 312 may modify a frame buffer corresponding to the user interface content 326 in order to obscure the portion 316 of the user interface content 326 corresponding to the set of screen coordinates provided by the customer support application 302. In some embodiments, the customer support application 302 may modify a video stream obtained from the computing device 312 to obscure the portion of the user interface content 326 corresponding to the set of screen coordinates. Returning to FIG. 3, the support application or other application of the computing device 312 may determine one or more fields or user interface elements included in the set of screen coordinates. The determined one or more fields or user interface elements may then be tagged or otherwise tracked so that sensitive information inputted into the fields or user interface elements remains obscured if moved. For example, if the computing device 312 in rotated and the aspect ratio is changed, as described above, the password field 314 may remain obscured even if the password field 314 is moved as a result of the change in the aspect ratio. In another example, the password field 314 may remain obscured if the field is moved by the user. Additionally, the set of screen coordinates may include Euclidean coordinates, polar coordinates comprising a center and a radius to define a circle, a set of coefficients of an ellipse to define the ellipse, or anything other coordinate system suitable for defining a portion of the display of the user's computing device. Furthermore, the coordinates may define a portion of the display of the user's computing device in three dimensions. For example, for some displays, a three dimensional coordinate system may be required to define a three dimensional volume to be obscured.

In other embodiments, the customer support application may provide the customer support agent with other support tools not shown in FIG. 3. For example, the customer support application may include a library of pre-generated support graphics which may be selected by the customer support agent to be transmitted for display on the user's computing device 312. These pre-generated support graphics may comprise static images and/or animations. This may be particularly useful for teaching users solutions to common problems. For example, after a user indicates that he needs assistance with a login screen, the support graphics may include a mask to cover the portion 316 of the screen. In some embodiments, the library of pre-generated support graphics displayed on the customer support application are selected based on information received from the user's computing device 312, such as the model type, operating system software running on the computing device 312, and orientation of the display (e.g., landscape or portrait). This may be useful when the sequence of steps and/or locations of menus and icons may vary between different device models, operating system revision level, and orientation of display. By utilizing this user information to select the appropriate pre-generated support graphics made available to the customer support agent, the customer support agent can provide a more precise and user-specific support experience.

In yet other embodiments, different forms of communication between the customer support agent and the user may be provided. For example, the live chat between the customer support agent and the user may be text-based, without audio or video communication. Text based communication may be more desirable in situations where data communications between the user and support agent is limited or expensive. The support agent computing device 330 may also include a webcam for capturing a live streaming video of the customer support agent using the support agent computing device 330. The customer support application may include a video image so that the agent's image will be transmitted to the user's computing device 312 and shown in the video image portion of an agent interface element. The agent interface element may contain additional graphical elements and/or controls, such as, for example, a control portion. The control portion may include an information portion, displaying text, such as the agent's name, and one or more control icons, which, when selected by the user, can perform various functions, such as enable the user to mask a portion of the user interface content 326. Additional controls may also be displayed to enable the user to perform additional functions, such as launching a secure clipboard application.

Figure 4:
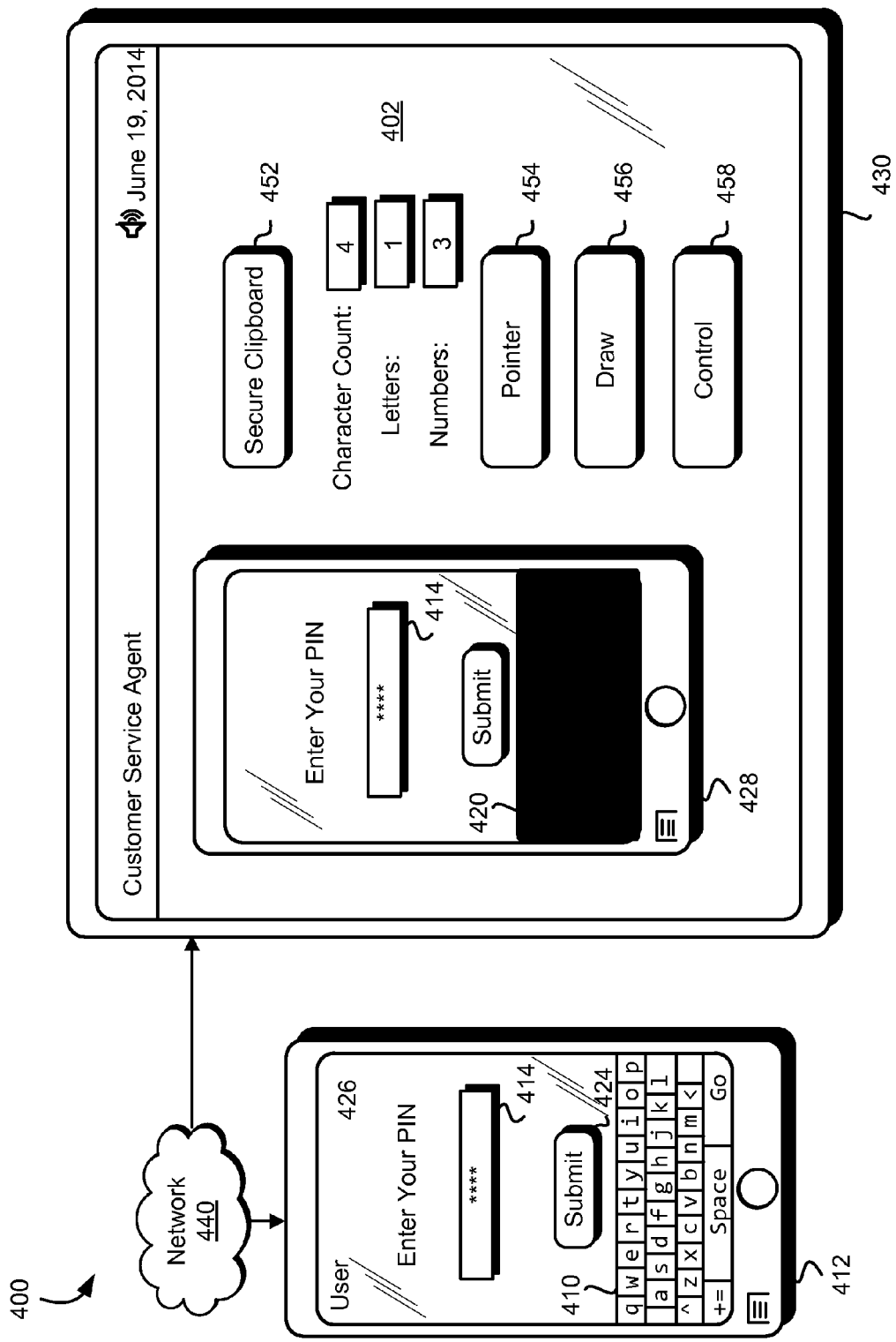
FIG. 4 is an environment illustrating a secure clipboard for use with a customer support application including additional information provided to the customer support in accordance with an embodiment.

FIG. 4 in various embodiments, a computing device 412 includes a support application enabling a user to connect with a support agent operating a support agent computing device 430. Accordingly, as illustrated in FIG. 4, one state of the display of the computing device 412 may include an authentication screen 426. The authentication screen 426 may, for example, include a personal identification number (PIN) field 414 and a submit button 424 to enable a user to submit credentials input into the PIN field 414 using a keyboard 410 of the computing device 412. The authentication information may be any information obtained by the computing device 412 either by user input or one or more sensors and/or other components of the computing device 412. For example, the authentication information may be a hash of the PIN entered by the user in the PIN field 414. The computing device 412 may obtain information corresponding to the user input into the PIN field and provide the obtained information to the support agent computing device 430 over a network 440. Furthermore, the keyboard 410 and/or support application may be configured to obscure 420 the keyboard in the screen sharing image 428. By obscuring 420 the keyboard, the agent may not be able to see the user's key strokes when entering sensitive information. Furthermore, the support application may obscure various different types of inputs provided by the user. For example, the support agent may be able to mute an input from a microphone of the computing device 412. The support application may mute the input from the microphone while the user is speaking a password, PIN, other sensitive information, or personal identification information.

As illustrated by FIG. 4, for example, the support application implemented in the computing device 412 may provide the support agent computing device 430 with information corresponding to characters inputted into the PIN field 414. The support application may register for key stroke events produced by the keyboard 410. The keyboard 410 may be provided by an operating system of the computing device 412. The support application may determine additional information from the key stroke events, such as character count, number of letters, types of characters, number of upper case or lower case letters, or any other information suitable for providing customer support to a user of the computing device 412. In various embodiments, the agent is provided with the additional information described above only if the agent is a manager or higher level support agent. For example, if a first agent is unable to help the user solve the user's issue or problem, the user may be escalated to a higher level support agent in an attempt to resolves the user's issue.

In the illustrated embodiment, the customer support application 402 includes a control tool 458, a drawing tool 456, a pointer tool 454, and a secure clip board tool 452. Furthermore, the agent may utilize peripheral input devices of the customer support agent computing device 430 such as, for example, a mouse and a keyboard, to select one of the tools and then interact with the screen sharing image 428 using that tool to produce the desired result on the user's computing device 412. The control tool 458, the drawing tool 456, and the pointer tool 454 may be configured as described above in connection with FIG. 2.

The computing device 412 may also obtain information corresponding to a state of the computing environment which the computing device 412 is in. For example, the computing device 412 may collect information about one or more local area network and/or devices attached to the one or more local area networks. The computing device 412 may also capture information corresponding to the state of the computing environment using one or more sensors included in the computing device 412. For example, the computing device 412 may capture one or more images using cameras included in the computing device 412. In another example, the computing device 412 may record a user finger-print using a finger-print scanner included in the computing device 412. The authentication information provided by the computing device 412 may be verified by the agent.

Figure 5:
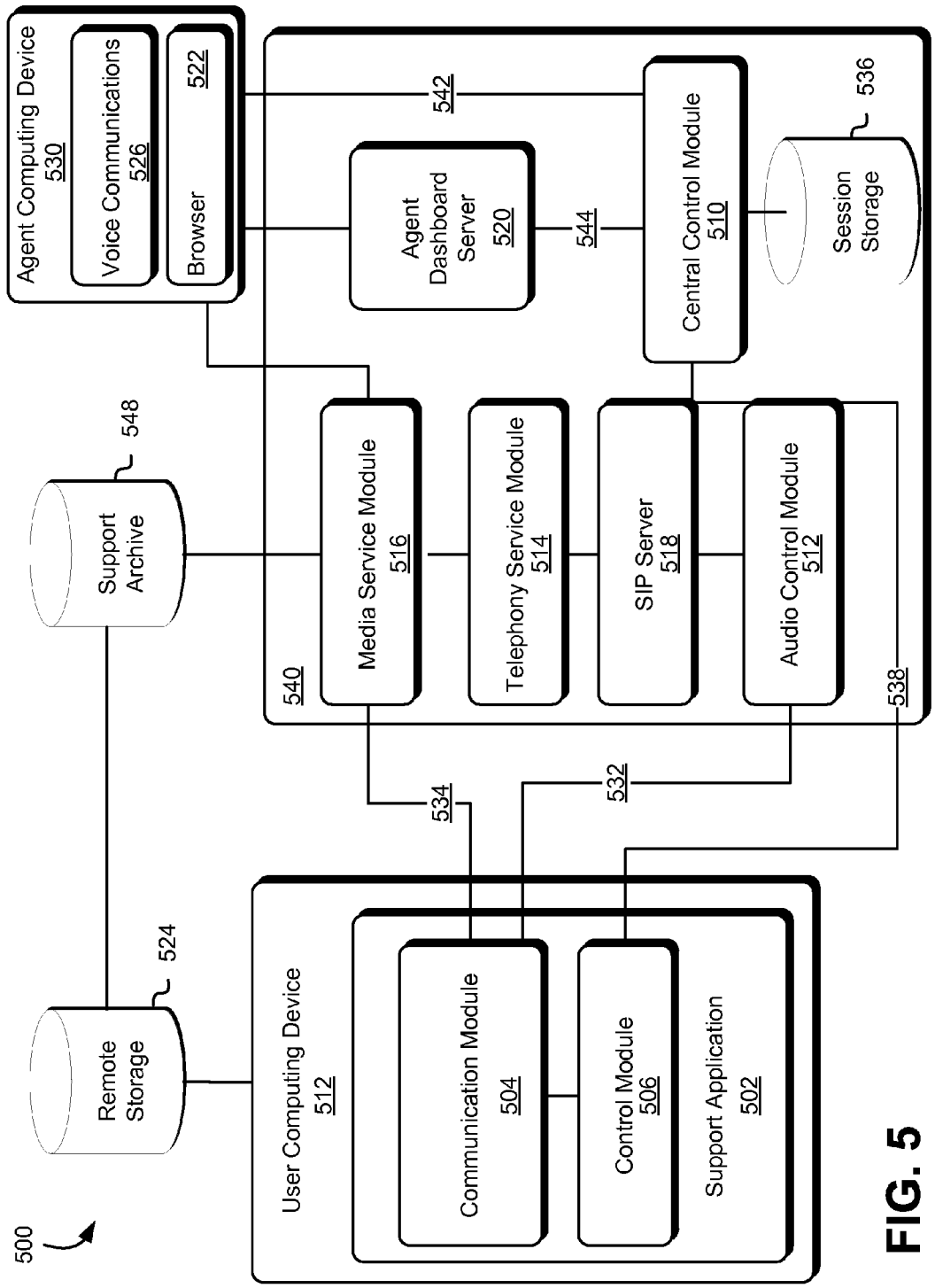
FIG. 5 is a block diagram illustrating an exemplary environment in accordance with an embodiment.

FIG. 5 is a block diagram illustrating an exemplary environment in which embodiments of the present invention may be implemented. The user's computing device 512 is provided with a processing element and memory configured to execute various software applications, including a support application 502 comprising a communication module 504 and a control module 506. The support agent computing device 530 is provided as part of a support network 540, which includes a central control module 510, an audio control module 512, a Session Initiation Protocol (SIP) server 518 (or other communications server), a telephony service module 514, a media service module 516, a support archive 548, and an agent dashboard server 520. The support agent computing device 530 also includes a processing element and memory configured to execute various software applications, including a web browser application 522. The support agent computing device 530 may also include a voice communications module 526, which may include a voice communications headset or other microphone and speaker hardware and corresponding software for handling voice communications between the agent computing device 530 and the user computing device 512. Although various components are illustrated as discrete blocks in FIG. 5, it is to be understood that the blocks are merely illustrative and the functionality of each component may be implemented using software executing one or more computing devices, such as a series of servers located in different physical locations.

The user computing device 512 may include a Linux-based operating system, such as the Android® operating system by Google, Inc., and the support application 502 may comprise a browser-based software application operating in the applications layer of the operating system. The communication module 504 may implement, for example, a protocol for browser-based real-time communication, such as WebRTC. The communication module 504 enables the real-time one-way or two-way media streaming between the browser-based support application 502 running on the user computing device 512 and the browser application 522 on the support agent computing device 530. When the user computing device 512 is running the Android® operating system, the communication module 504 may utilize a Web View element to render the graphical content provided by the support agent computing device 530 and displayed on top of the user interface content.

The central control module 510 may comprise a management application running on a computer server in the support network 540. The central control module 510 handles control and communication between a plurality of user computing devices and support agent computing devices and other components of the support network 540. When a user launches the support application on a computing device (e.g., support application 502 on computing device 512), the support application 502 establishes a connection with the central control module 510 via a session control channel 538. The central control module 510 initiates a new support session and transmits the session information to the agent dashboard server 520 via communications channel 544. The communications channel 544 is used to transmit session status and control information to the support application 502 and may also be used to receive information to initiate an audio communication session between the user computing device 512 and the agent computing device 530. The agent dashboard server 520, in turn, assigns the new support session to one of the customer support agent computing devices (e.g., customer support agent computing device 530). The central control module 510 stores information regarding all of the customer support sessions provided by the support network 540 in session database 536. The central control module 510 also maintains an agent control channel 542 with the agent browser 522. The agent control channel 542 may be used to transmit graphics between the user computing device 512 and the agent computer device 530, and may also be used to transmit signal information to establish the media session between the user computing device 512 and the agent computing device 530.

The audio control module 512 manages the voice communication between the user computing device 512 and the agent computing device 530. The audio control module 512 may comprise a session border controller (SBC) to manage Voice Over IP communications between the user computing device 512 and the agent computing device 530, including management of quality of service (QoS) parameters, such as rate limiting, bitrate management. The audio control module 512 receives the voice data via audio channel 532 and passes the voice data to the telephony service module 514. The telephony service module 514 then routes the voice communication to the corresponding agent computing device 530 via the agent dashboard server 520. The audio channel 532 can establish the voice session using a signaling communications protocol such as the Session Initiation Protocol (SIP) and a transport protocol such as the Realtime Transport Protocol (RTP).

The media service module 516 handles the graphical media streaming between the user computing device 512 and the agent computing device 530. In various embodiments, the media service module 516 may be responsible for obscuring the sensitive information of the video stream prior to providing the video stream to the agent computing device 530. The media service module 516 may be implemented as a computer server implementing a Traversal Using Relays around NAT ("TURN") protocol for handling data over TCP and UDP connections. The graphical media streaming handled by the media service module 516 can include one or more of the screen sharing graphics from the user computing device 512, the graphical elements from the agent computing device 512, and the video image of the agent. The media streaming between the communication module 504 and the media service module 516 via WebRTC can be provided over a media channel 534. In some embodiments, the graphical elements from the agent computing device 540 may be transmitted from the central control module 510 to the control module 506 on the user computing device 512 via session control channel 538.

The support archive 548 comprises a storage system that can be used to store all of the media exchanged during a customer support session between the user computing device 512 and agent computing device 530. The stored media may be used for training and audit purposes, such as to review the performance of the various customer support agents in the support network 540. In accordance with some embodiments of the present invention, the stored session data may be made available to the user so that the user may review a recording of a previously-held customer support session. This can be particularly helpful to users who wish to review the instructions provided by the customer support agent. In some embodiments, after a customer support session is completed, the stored session data, including one or more of the audio, video, screen sharing, and graphical elements from the agent, may be transmitted to the user's remote storage 524 for later retrieval and playback by the user. The stored session data may be stored as a video file that can be played back and viewed by the user exactly as the user had experienced it live during the customer support session. Furthermore, in various embodiments, the user's sensitive information, such as passwords and credit card information, is provided to the remote storage 524. For example, the user may utilize the secure clipboard application to input credit card information to be stored by the agent in association with the user's account. The user's computing device 512 may encrypt the credit card information and store the encrypted credit card information in the remote storage 524. The agent computing device 530 may then be provided with location information to the encrypted credit card information stored in the remote storage 524, and the agent may then associate the credit card information with the user's account using the location information provided by the user computing device 512.

Figure 6:
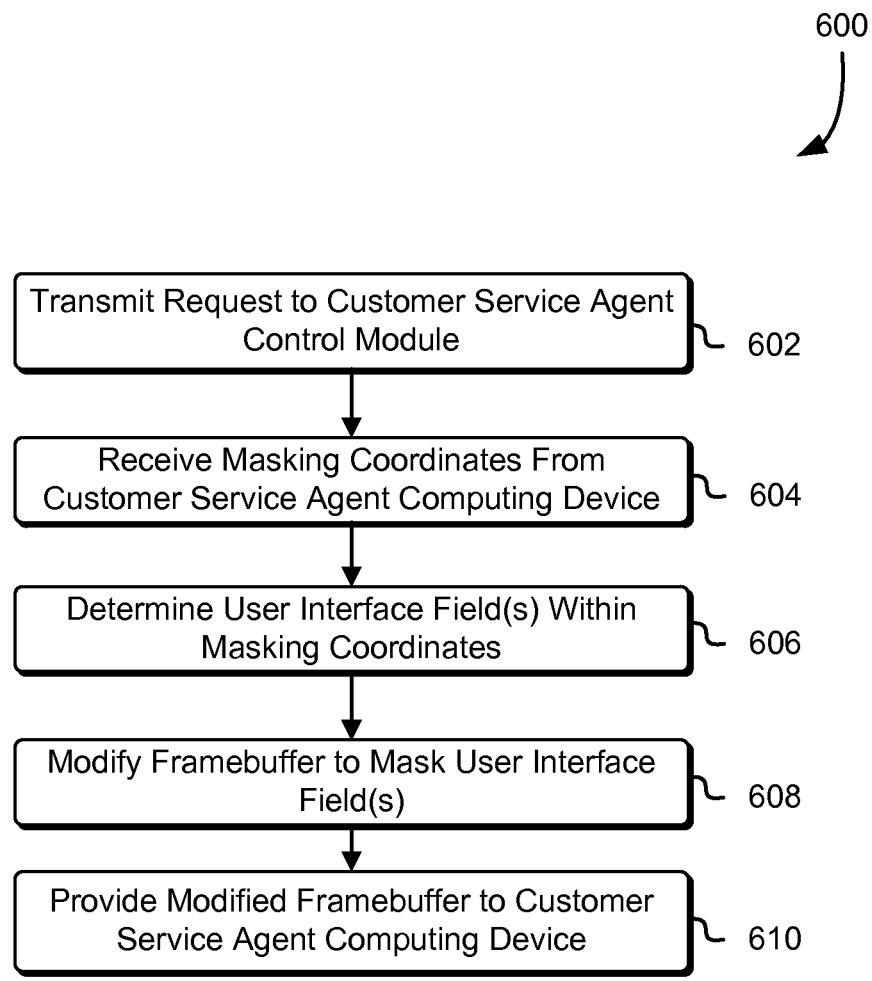
FIG. 6 illustrates an example process for generating a modified frame buffer for masking sensitive information in accordance with an embodiment.

FIG. 6 shows an illustrative example of the process 600 which may be used to obscure a user's sensitive information during a customer support session with a customer support agent. The process 600 may be performed by any suitable system, such as the computing device and the customer support agent computing device described above in connection with FIGS. 2-5. Returning to FIG. 6, in an embodiment, the process 600 includes transmitting a request to a customer support agent control module 602. As described above, a user may launch a customer support session through a support application executed by the user's computing device. For example, the user may select a "help" button displayed on a user interface of the computing device. The customer support agent control module may then establish a customer support session between an agent operating a customer support agent computing device and the user's computing device. The session may include a video stream of the user interface displayed by the user's computing device. The agent may then select a portion of the user interface to be obscured. For example, the user may select a user interface element of a secure clipboard application as described above. In numerous variations to the process 600, the agent may select a secure clipboard tool displayed on an interface of the customer support agent computing device. The secure clipboard tool may cause a secure clipboard application to be executed by the user's computing device and the secure clipboard application be configured to be automatically obscured by the user's computing device. For example, the secure clipboard application may be a user interface element of the support application, or an encoding application may be configured to modify a frame buffer to obscure the secure clipboard user interface element.

Returning to FIG. 6, the user's computing device or application thereof, such as the support application, may receive masking coordinates from the customer support agent computing device 604. The masking coordinates may indicate an area of the user interface displayed by the user's computing device. The user's computing device may then determine one or more user interface fields and/or user interface elements within the area of the display indicated by the masking coordinates 606. Additionally, the user's computing device may tag or otherwise track the one or more user interface fields and/or user interface elements within the area of the display indicated by the masking coordinates. The user's computing device may then modify a frame buffer of the display of the user's computing device to mask or otherwise obscure the one or more user interface fields and/or user interface elements within the area of the display indicated by the masking coordinates 608. For example, the encoding application may obtain the masking coordinates and modify values of the frame buffer corresponding to the masking coordinates. The user's computing device may then provide the modified frame buffer to the customer support agent computing device 610. The provided frame buffer may be utilized by the customer support agent computing device to generate a representation of the display of the user's computing device.

Figure 7:
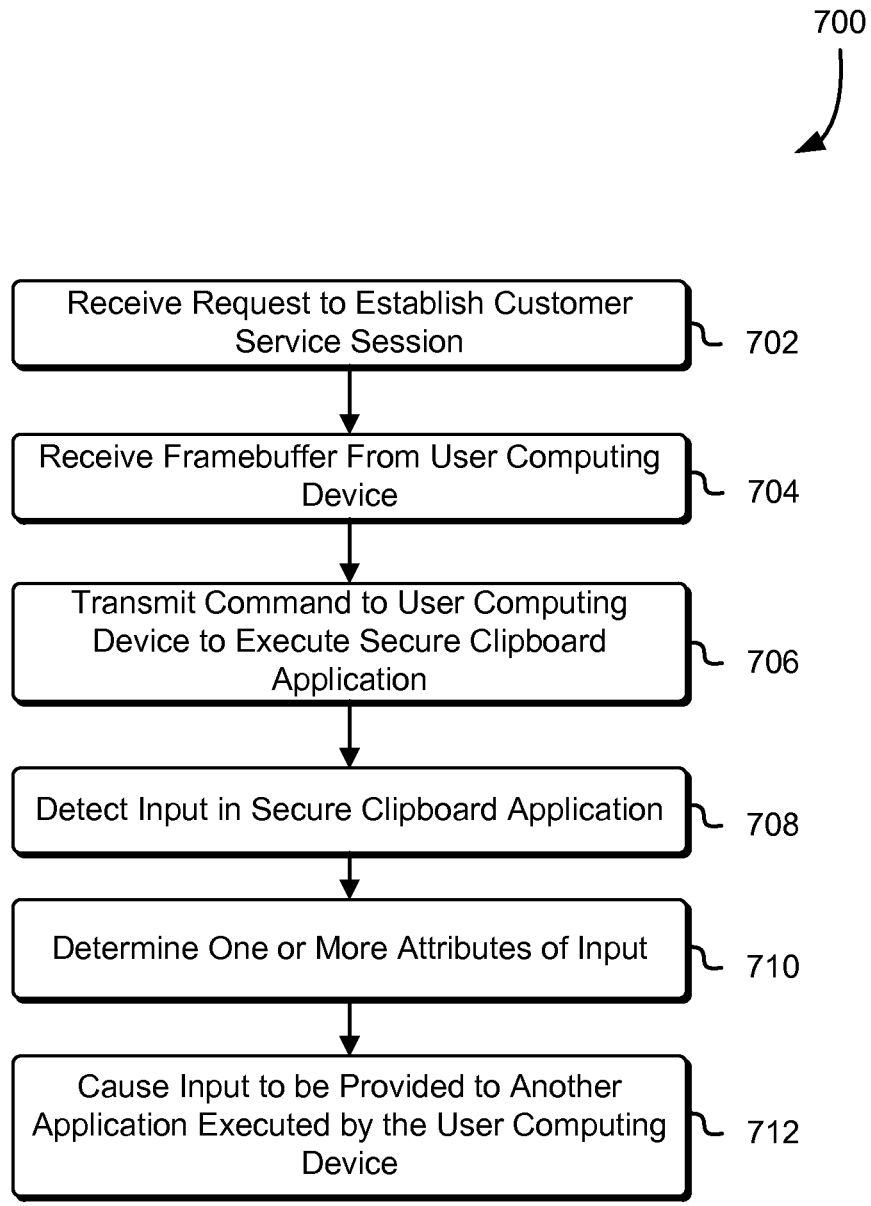
FIG. 7 illustrates an example process for utilizing a secure clipboard in connection with a customer support application in accordance with an embodiment.

FIG. 7 shows an illustrative example of the process 700 which may be used to obscure a user's sensitive information during a customer support session with a customer support agent. The process 700 may be performed by any suitable system, such as the computing device and the customer support agent computing device described above in connection with FIGS. 2-5. Returning to FIG. 7, in an embodiment, the process 700 includes receiving a request to establish a customer support session 702. The request may be received from a user computing device operated by a user seeking assistance from a customer support agent. As described above, a customer support agent computing device may be used to establish the customer support session through a customer support agent control module. During the customer support session, the customer support agent computing device may receive a frame buffer from the user's computing device. The user computing device may transmit a video stream to the customer support agent computing device. The video stream contains images of a user interface displayed by the user's computing device. The agent may utilize one or more tools provided to the agent to enable the agent to resolve issues the user may have.

During the customer support session, the agent may select the secure clipboard tool attempting to resolve the user's issue. As a result, the customer support agent computing device may transmit a command to the user's computing device to execute the secure clipboard application 706. As described above, the secure clipboard application may be a user interface element of a support application executed by the user's computing device or may be a standalone application. Furthermore, the secure clipboard application or information inputted into the secure clipboard application may be configured to be automatically obscured by the support application. The support application may then detect input into the secure clipboard application 708. For example, the support application may register for operating system events corresponding to the secure clipboard application. In another example, the secure clipboard application may be a user interface element of the support application, and the support application may simply obtain the input directly.

Information corresponding to the detected input may be provided to the customer support agent computing device. The customer support agent computing device may determine one or more attributes of the input based at least in part on the detected input 710. For example, the customer support agent computing device may determine a number of characters inputted by the user into the secure clipboard application. This may enable the agent to determine if the user has mis-typed the user's password. Returning to FIG. 7, the agent may cause the input into the secure clipboard application to be provided to another application executed by the user's computing device 712. For example, the user may enter a password into the secure clipboard application and the agent may, through the customer support agent computing device, cause the user's computing device to copy the password to a clipboard memory of the user's computing device and paste the password into a second application executed by the user's computing device, such as a web browser application or social networking application.

Figure 8:
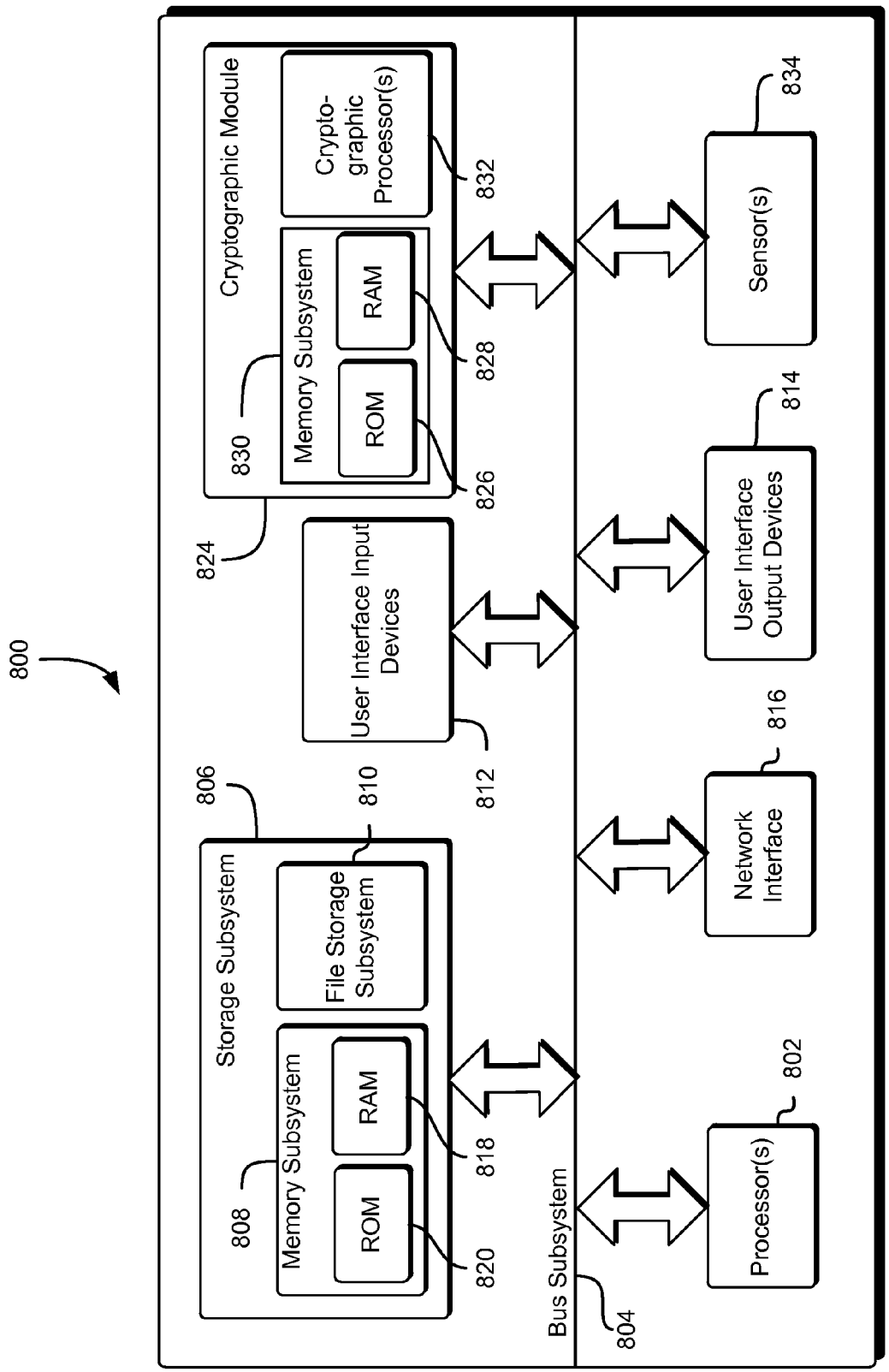
FIG. 8 shows an illustrative example of components of a computing device in accordance with at least one embodiment.

FIG. 8 is an illustrative, simplified block diagram of an example device system 800 that may be used to practice at least one embodiment of the present disclosure. In various embodiments, the device system 800 may be used to implement any of the systems illustrated herein and described above. For example, the device system 800 may be used to implement a support application in accordance with various embodiments. As shown in FIG. 8, the device 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface input devices 812, one or more user interface output devices 814, a network interface subsystem 816, a cryptographic module 824, comprising a memory subsystem 830 and one or more cryptographic processors 832. The peripheral subsystems may also include one or more sensors 834 in addition to sensors of input devices 812. Such sensors may include, but are not limited to, GPS sensors, accelerometers, temperature sensors and others.

The bus subsystem 804 may provide a mechanism for enabling the various components and subsystems of device system 800 to communicate with each other as intended. Although the bus subsystem 804 is shown schematically as a single bus, alternative embodiments of the bus subsystem may utilize multiple busses.

The network interface subsystem 816 may provide an interface to other device systems and networks. The network interface subsystem 816 may serve as an interface for receiving data from and transmitting data to other systems from the device system 800. For example, the network interface subsystem 816 may enable transmission of a video stream and other information, such as electronic requests to access a system (e.g., receive a webpage) and may enable receipt of responses to the requests, such as webpages or other information. The network interface subsystem 816 may also facilitate the receipt and/or transmission of data on other networks, such as an organization's intranet and/or other networks described below.

The user interface input devices 812 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in generating a support session, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 800.

User interface output devices 814, if any, may include a display subsystem, a printer or non-visual displays, such as audio and/or tactile output devices, etc. Generally, the output devices 814 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the device system 800. The output device(s) 814 may be used, for example, to present user interfaces to facilitate user interaction with applications performing processes described herein and variations therein, when such interaction may be appropriate. While a device 800 with user interface output devices is used for the purpose of illustration, it should be noted that the device 800 may operate without an output device, such as when the device 800 is operated in a server rack and, during typical operation, an output device is not needed.

The storage subsystem 806 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, and may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810.

The cryptographic module 824, which may be a trusted platform module (TPM), includes a memory subsystem 830, including a main random access memory (RAM) 828 for storage of instructions and data during program execution and a read only memory (ROM) 826, in which fixed cryptographic information may be stored, such as a hardware secret stored securely within the device 800 so as to be non-exportable (i.e., inaccessible through any call to the cryptographic module 824). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11888, which are incorporated herein by reference. The device 800 may also store cryptographic keys in RAM 828 and/or processor registers for temporary cryptographic processing. The cryptographic information stored in memory may be used in combination with cryptographic information obtained via the network interface 816 and/or one or more of the user interface input devices 812. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 824 may be configured to collectively perform various operations used for generating cryptographically verifiable information for security tasks.

As noted above, in various embodiments of the present disclosure, hardware secrets are securely stored within the cryptographic module 824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 9:
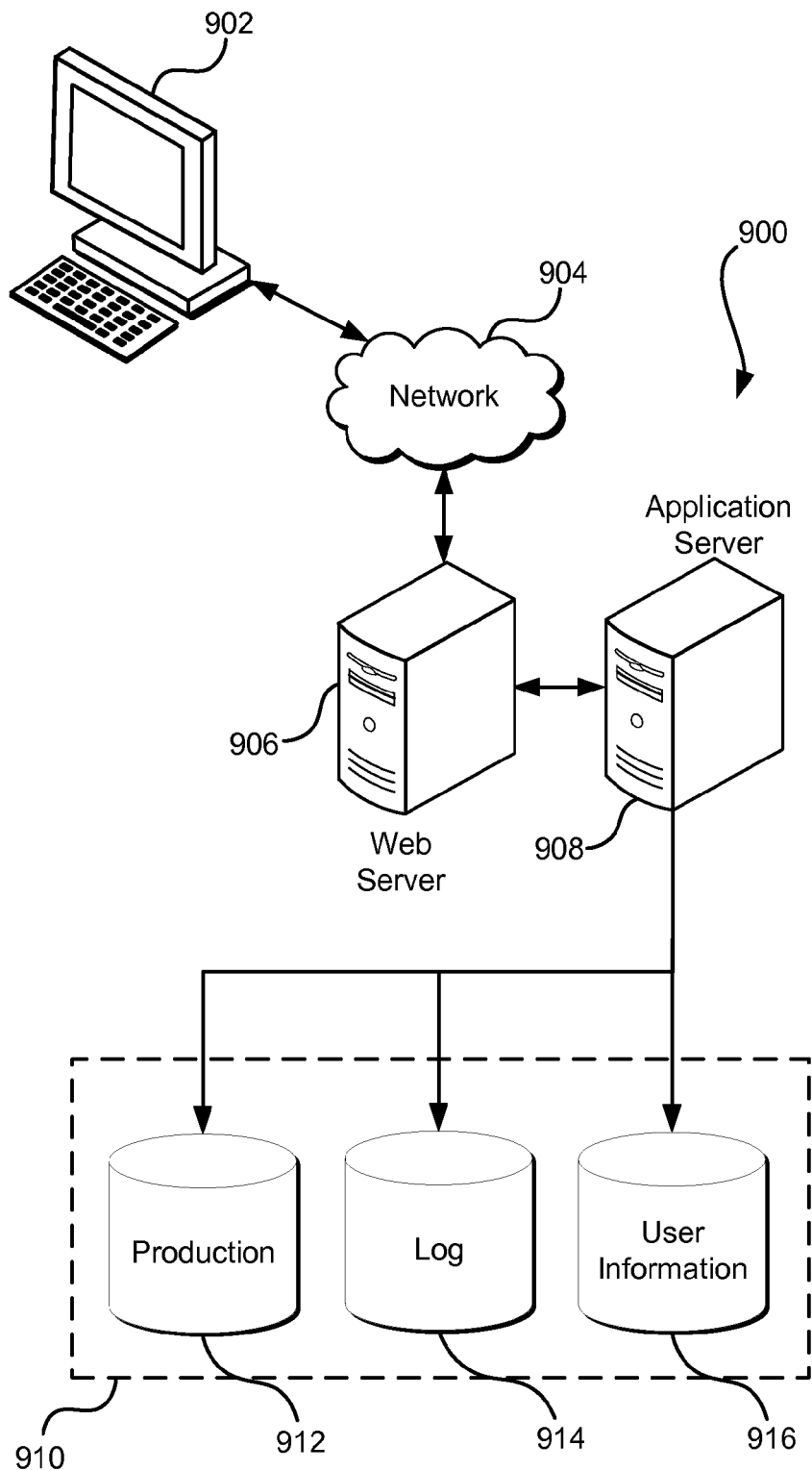
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under the control of one or more computer systems configured with executable instructions,
obtaining, from a support agent computing device, a set of screen coordinates indicating a portion of a user interface of a user device configured to receive sensitive information from an input device, the portion of the user interface to be obscured from an agent operating the support agent computing device and corresponding to a secure clipboard user interface element of a support application, the secure clipboard user interface element of the support application appearing in the user interface of the user device as a result of a command originating from the support agent computing device;
obtaining user interface content displayed by the user interface;
modifying the obtained user interface content by at least obscuring the portion of the user interface corresponding to the set of screen coordinates, wherein the user interface content is visible in a display of the user device in the secure clipboard user interface element but obscured to a customer support agent operating the support agent computing device; and
providing the modified user interface content to the support agent computing device.

2. The computer-implemented method of claim 1, wherein the set of screen coordinates are obtained from the support agent computing device as a result of an operation performed at least in part by a customer support agent operating the support agent computing device.

3. The computer-implemented method of claim 1, wherein the computer-implemented method further includes detecting the portion of the user interface configured to receive sensitive information from an input device.

4. A system, comprising:
one or more processors; and
memory with executable instructions that, when executed by the one or more processors cause the system to:
obtain, from a customer support service, information corresponding to a portion of content presented via a presentation device associated with a computing device, the portion of the content presented via the presentation device is defined, at least in part, by a secure clipboard application and the computing device configured to receive information, the secure clipboard application executed as a result of a command originating from a support agent computing device of the customer support service;
encode a media stream of the content presented via the presentation device where the encoded media stream is encoded such that the portion of the content presented via the presentation device is not perceivable in the encoded media stream but perceivable in the presentation device;
establish a connection between the computing device and the support agent computing device operated by a customer support service; and
provide the encoded media stream to the customer support service.

5. The system of claim 4, wherein the content presented via the presentation device further includes a password field.

6. The system of claim 4, wherein the memory further includes executable instructions that, when executed by the one or more processors, cause the system to:
receive, from the customer support service, the command, the command configured to cause execution of execute the secure clipboard application.

7. The system of claim 4, wherein the memory further includes executable instructions that, when executed by the one or more processors, cause the system to:
receive information through the portion of the content presented via the presentation device; and
provide the received information to the customer support service.

8. The system of claim 4, wherein the presentation device is a touch screen that presents a virtual keyboard configured to receive user input in the form of selected characters.

9. The system of claim 4, wherein memory further includes executable instructions that, when executed by the one or more processors, cause the system to obtain the content presented via the presentation device from a frame buffer of the computing device.

10. The system of claim 4, wherein memory further includes executable instructions that, when executed by the one or more processors, cause the system to:
receive information through the portion of the content presented via the presentation device;
provide the received information to a remote storage location; and
provide location information corresponding to the remote storage location to the customer support service.

11. A non-transitory computer-readable storage medium having stored thereon executable instructions that, when executed by one or more processors of a computer system, cause the computer system to at least:
obtain, from a support agent computing device, information specifying a portion of a display, the portion associated with a secure clipboard user interface element of the display and the display configured to receive sensitive information, the secure clipboard user interface element appearing as a result of a command originating from the support agent computing device;
obtain display content of the display;
modify the obtained display content by at least obscuring content presented in the portion of the display to obtain modified content; and
provide the modified display content to at least one other computer system including the support agent computing device, wherein an input entered into the portion of the display is included in the display but excluded from the modified display content provided to the at least one other computer system.

12. The non-transitory computer-readable storage medium of claim 11, wherein the instructions further comprise instructions that, when executed by the one or more processors, cause the computer system to execute the secure clipboard user interface element as a result of receiving the command from the at least one other computer system, the secure clipboard user interface element further configured to receive sensitive information and be obscured in the modified display content.

13. The non-transitory computer-readable storage medium of claim 12, wherein the instructions that cause the computer system to execute the secure clipboard user interface element further include instructions that cause the computer system to display the secure clipboard user interface element as component of a support application.

14. The non-transitory computer-readable storage medium of claim 11, wherein the instructions further comprise instructions that, when executed by the one or more processors, cause the computer system to register for operating system events corresponding to inputs to the portion of the display.

15. The non-transitory computer-readable storage medium of claim 14, wherein the instructions further comprise instructions that, when executed by the one or more processors, cause the computer system to:
receive a set of operating system events corresponding to inputs to the portion of the display; and
determine one or more attributes of the set of operating system events.

16. The non-transitory computer-readable storage medium of claim 11, wherein the instructions that cause the computer system to obtain the information further include instructions that, when executed by the one or more processors, cause the computer system to obtain the information as a result of the portion of the display corresponding to sensitive information within the display.

17. The non-transitory computer-readable storage medium of claim 11, wherein the instructions that cause the computer system to obtain the information specifying the portion of the display further include instructions that, when executed by the one or more processors, cause the computer system to display a user interface element defined by a set of coordinates, obtained from the at least one other computer system, such that the user interface element is visible in the display and obscured in the modified display content.

18. The non-transitory computer-readable storage medium of claim 11, wherein the instructions further comprise instructions that, when executed by the one or more processors, cause the computer system to:
receive sensitive information inputted into the display; and
provide the received sensitive information to at least one other application.

* * * * *

UNITED STATES PATENT AND TRADEMARK OFFICE
CERTIFICATE OF CORRECTION

PATENT NO. : 9,514,333 B1
APPLICATION NO. : 14/572629
DATED : December 6, 2016
INVENTOR(S) : Anand Patel et al.

It is certified that error appears in the above-identified patent and that said Letters Patent is hereby corrected as shown below:

In the Specification

Column 16, Lines 41-46:
The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11888, which are incorporated herein by reference.

Should read as:
The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference.

Signed and Sealed this
Thirteenth Day of June, 2017

Joseph Matal
*Performing the Functions and Duties of the
Under Secretary of Commerce for Intellectual Property and
Director of the United States Patent and Trademark Office*